US011472282B2

(12) United States Patent
Oldeide et al.

(10) Patent No.: US 11,472,282 B2
(45) Date of Patent: Oct. 18, 2022

(54) ELECTRICAL VEHICLE AXLE

(71) Applicant: KA Group AG, Zurich (CH)

(72) Inventors: Christer Kobbevik Oldeide, Kongsberg (NO); Abel Bajay, Kongsberg (NO); Henrik Haugum, Drammen (NO); Sindre Abrahamsen, Oslo (NO); Sven Bjørkgård, Kongsberg (NO); Simen Johnsen, Oslo (NO); Kent Hall, Hyggen (NO)

(73) Assignee: KA GROUP AG, Zurich (CH)

( * ) Notice: Subject to any disclaimer, the term of this patent is extended or adjusted under 35 U.S.C. 154(b) by 105 days.

(21) Appl. No.: 17/256,800

(22) PCT Filed: Jun. 28, 2019

(86) PCT No.: PCT/IB2019/000997
§ 371 (c)(1),
(2) Date: Dec. 29, 2020

(87) PCT Pub. No.: WO2020/012249
PCT Pub. Date: Jan. 16, 2020

(65) Prior Publication Data
US 2021/0107349 A1  Apr. 15, 2021

Related U.S. Application Data

(60) Provisional application No. 62/693,599, filed on Jul. 3, 2018, provisional application No. 62/754,353, filed
(Continued)

(51) Int. Cl.
B60K 7/00       (2006.01)
B60K 1/02       (2006.01)
(Continued)

(52) U.S. Cl.
CPC .............. *B60K 7/0007* (2013.01); *B60K 1/02* (2013.01); *B60K 17/046* (2013.01); *B62D 59/04* (2013.01);
(Continued)

(58) Field of Classification Search
CPC ...... B60K 7/0007; B60K 1/02; B60K 17/046; B60K 2007/0061; B62D 59/04
See application file for complete search history.

(56) References Cited

U.S. PATENT DOCUMENTS 5,878,830 A    3/1999  Ruppert et al.
6,260,645 B1   7/2001  Pawlowski et al.
(Continued)

FOREIGN PATENT DOCUMENTS

CN    105799480 A    7/2016
EP    1329352 A2     7/2003
(Continued)

OTHER PUBLICATIONS

International Preliminary Report on Patentability for International Application No. PCT/IB2019/000764; International Filing Date Jun. 28, 2019; Report dated Dec. 2, 2020 (pp. 1-10).
(Continued)

*Primary Examiner* — Erez Gurari
(74) *Attorney, Agent, or Firm* — Cantor Colburn LLP

(57) ABSTRACT

A vehicle includes a frame, a first support member including a first end, a second end and an intermediate portion supporting a first axle receiver, a first bellows mounted to the first end of the first support member, a second bellows mounted to the second end of the first support member, a second support member including a first end portion, a second end portion and an intermediate section supporting a second axle receiver, a third bellows mounted to the first end portion of the second support member, a fourth bellows
(Continued)

mounted to the second end portion of the second support member, a first drive unit including a first transmission mounted to the first support member, and a first electric motor connected to the first transmission, and a second drive unit including a second transmission mounted to the second support member, and a second electric motor connected to the second transmission.

15 Claims, 17 Drawing Sheets

Related U.S. Application Data on Nov. 1, 2018, provisional application No. 62/693,599, filed on Jul. 3, 2018, provisional application No. 62/754,353, filed on Nov. 1, 2018.

(51) Int. Cl.
   *B60K 17/04* (2006.01)
   *B62D 59/04* (2006.01)

(52) U.S. Cl.
   CPC . *B60K 2007/0061* (2013.01); *B60Y 2200/142* (2013.01); *B60Y 2200/147* (2013.01)

(56) References Cited

U.S. PATENT DOCUMENTS

| | | | |
|---|---|---|---|
| 6,276,474 B1 | 8/2001 | Ruppert et al. | |
| 7,743,859 B2 | 6/2010 | Forsyth | |
| 8,718,897 B2 | 5/2014 | Wright et al. | |
| 8,727,923 B2 | 5/2014 | Huelsemann | |
| 9,038,707 B2 * | 5/2015 | Mair | B60G 9/003 |
| | | | 164/137 |
| 9,045,029 B2 * | 6/2015 | Mair | B60K 1/00 |
| 2003/0023357 A1 | 1/2003 | Trudeau et al. | |
| 2004/0007406 A1 | 1/2004 | Laurent et al. | |
| 2008/0018110 A1 * | 1/2008 | Roth | H02K 5/00 |
| | | | 290/3 |
| 2011/0195811 A1 | 8/2011 | Huelsemann | |
| 2015/0292601 A1 | 10/2015 | Tesar | |
| 2016/0318421 A1 * | 11/2016 | Healy | B60L 50/60 |
| 2018/0086227 A1 * | 3/2018 | Healy | B60L 15/2018 |
| 2021/0086600 A1 * | 3/2021 | Brock | B60K 1/00 |
| 2021/0122227 A1 * | 4/2021 | Bindl | B60T 13/12 |
| 2021/0379983 A1 * | 12/2021 | Baillie | B60K 11/02 |
| 2022/0041069 A1 * | 2/2022 | Layfield | B60W 30/18127 |
| 2022/0118848 A1 * | 4/2022 | Fliearman | B60K 17/02 |
| 2022/0144355 A1 * | 5/2022 | Stenbratt | B60L 15/38 |

FOREIGN PATENT DOCUMENTS

| | | | | |
|---|---|---|---|---|
| GB | 2521647 A | * | 7/2015 | ........... B60K 17/303 |
| GB | 2521647 A | | 7/2015 | |
| WO | 2013112158 A1 | | 8/2013 | |
| WO | WO-2017172788 A1 | * | 10/2017 | ............. B60G 9/022 |
| WO | WO-2020012249 A1 | * | 1/2020 | ............... B60K 1/02 |

OTHER PUBLICATIONS

International Preliminary Report on Patentability for International Application No. PCT/IB2019/000997; International Filing Date Jun. 28, 2019; Report dated Oct. 12, 2020 (pp. 1-16).
International Search Report and Written Opinion for International Application No. PCT/IB2019/000764; International Filing Date Jun. 28, 2019; Report dated Dec. 17, 2019 (pp. 1-15).
International Search Report and Written Opinion for International Application No. PCT/IB2019/000997; International Filing Date Jun. 28, 2019; Report dated Dec. 17, 2019 (pp. 1-17).

* cited by examiner

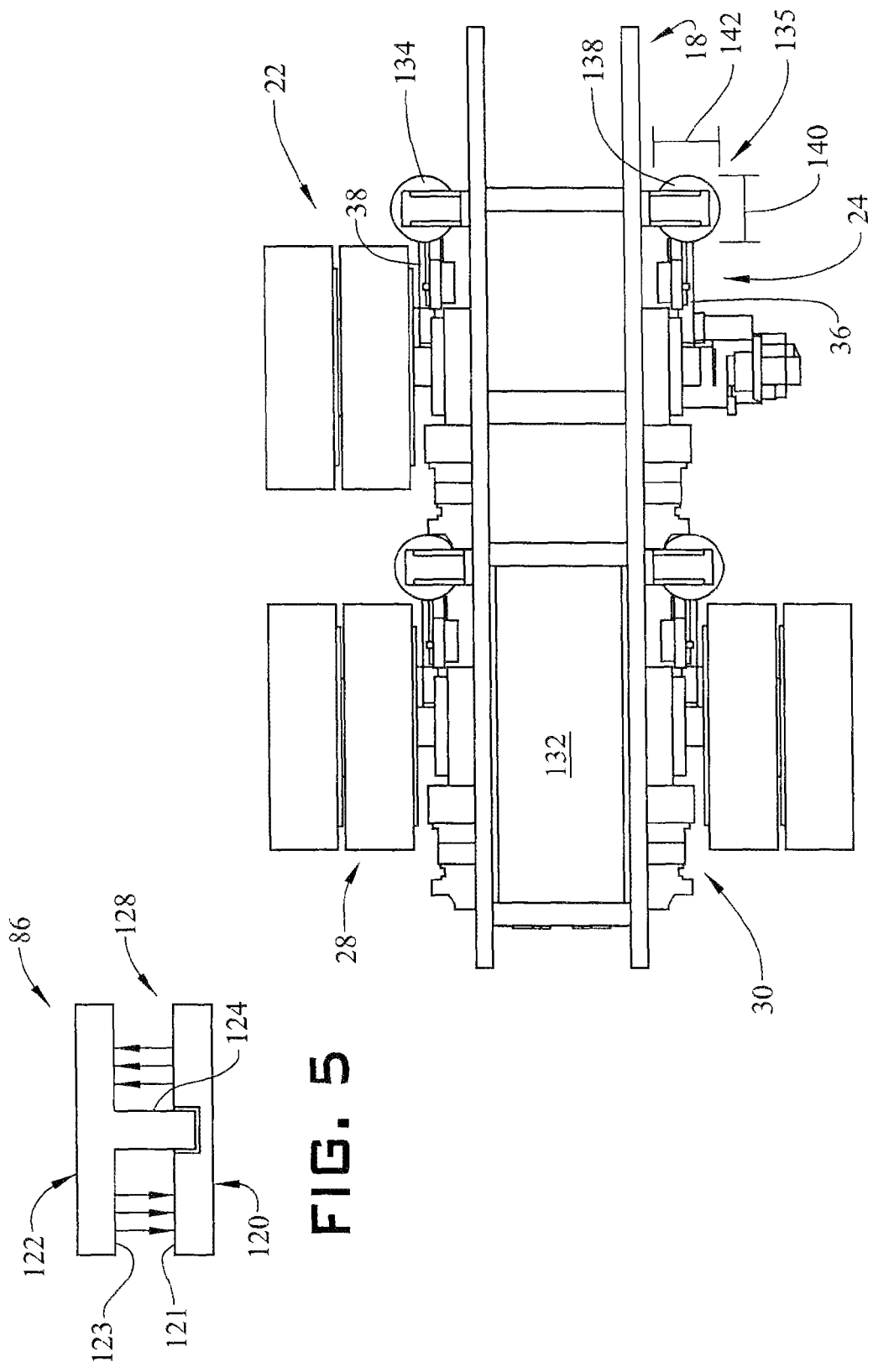

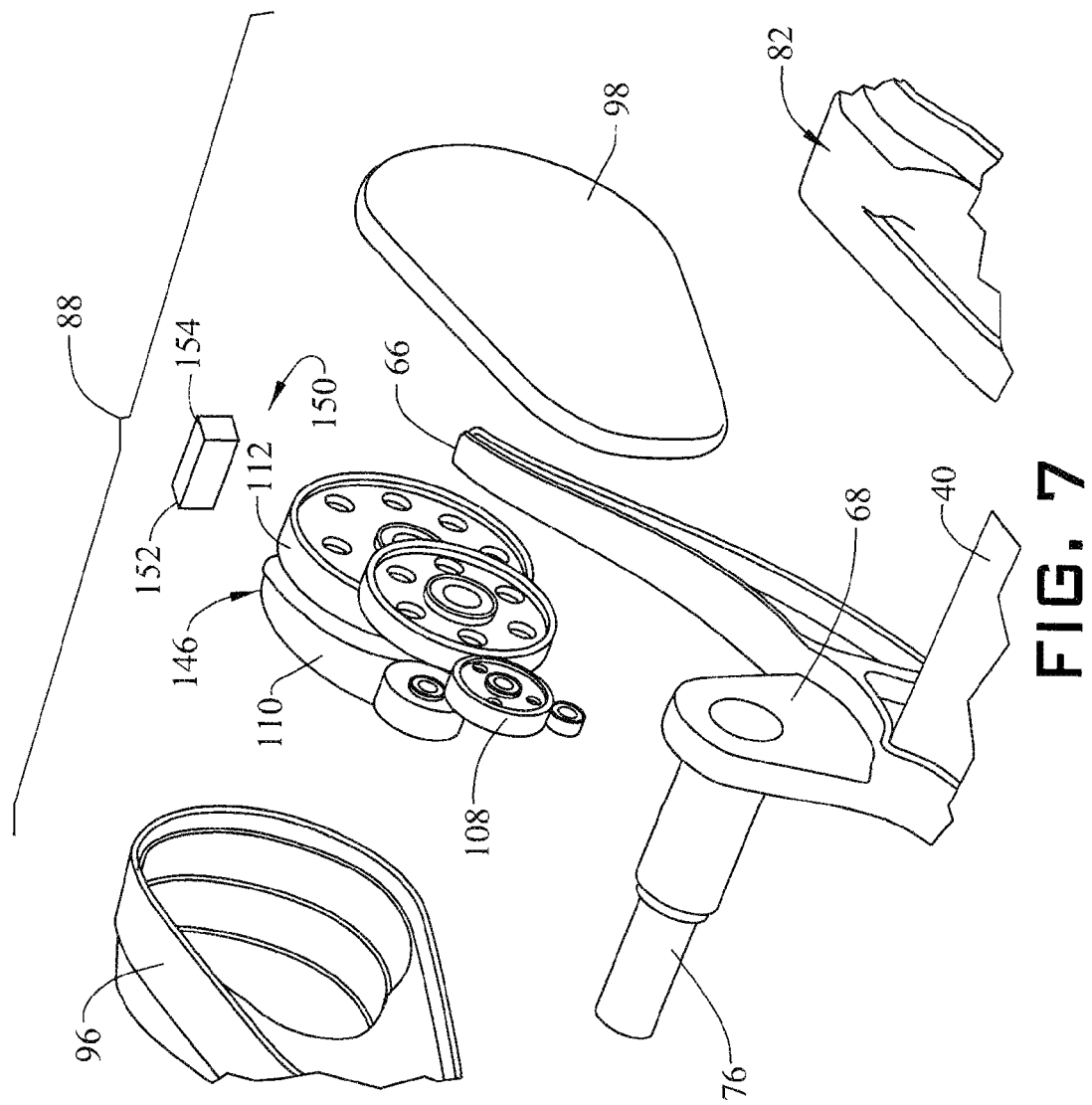

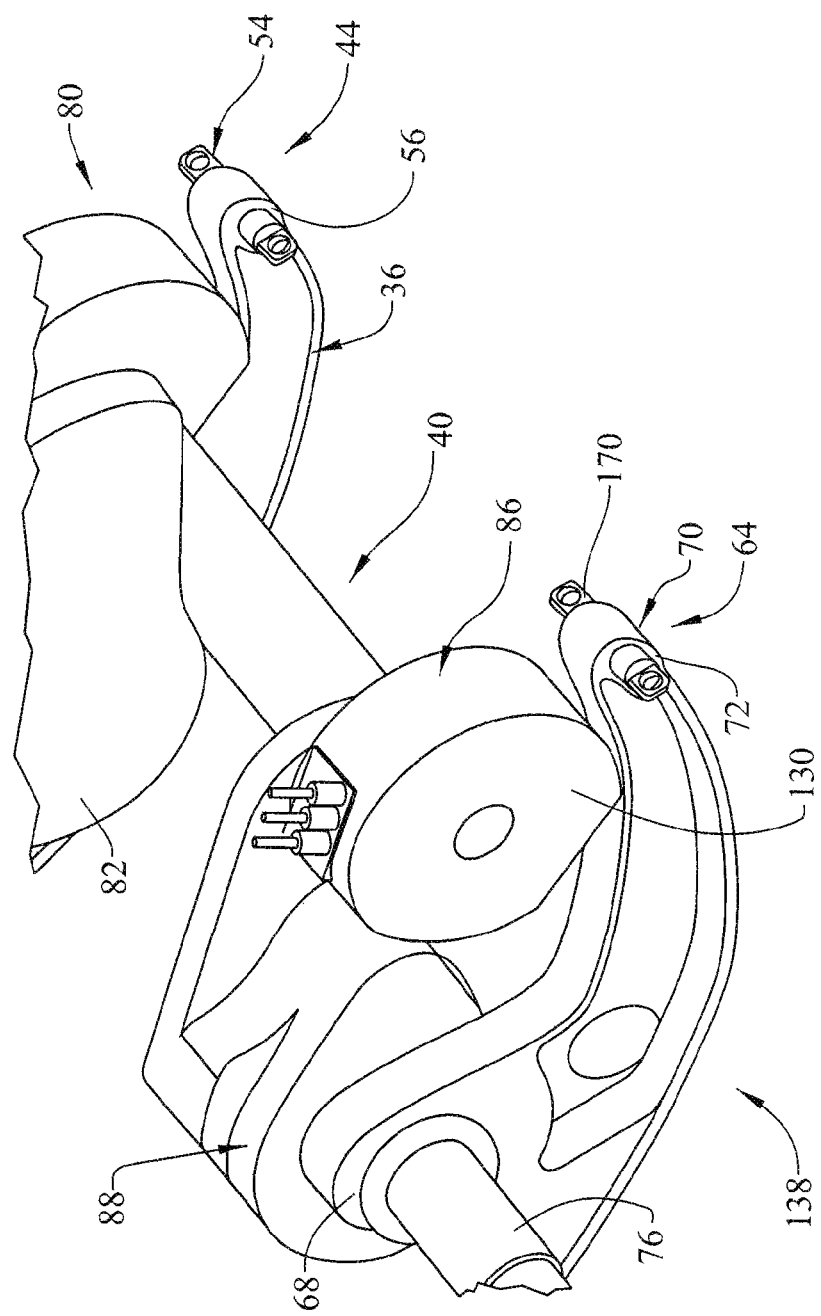

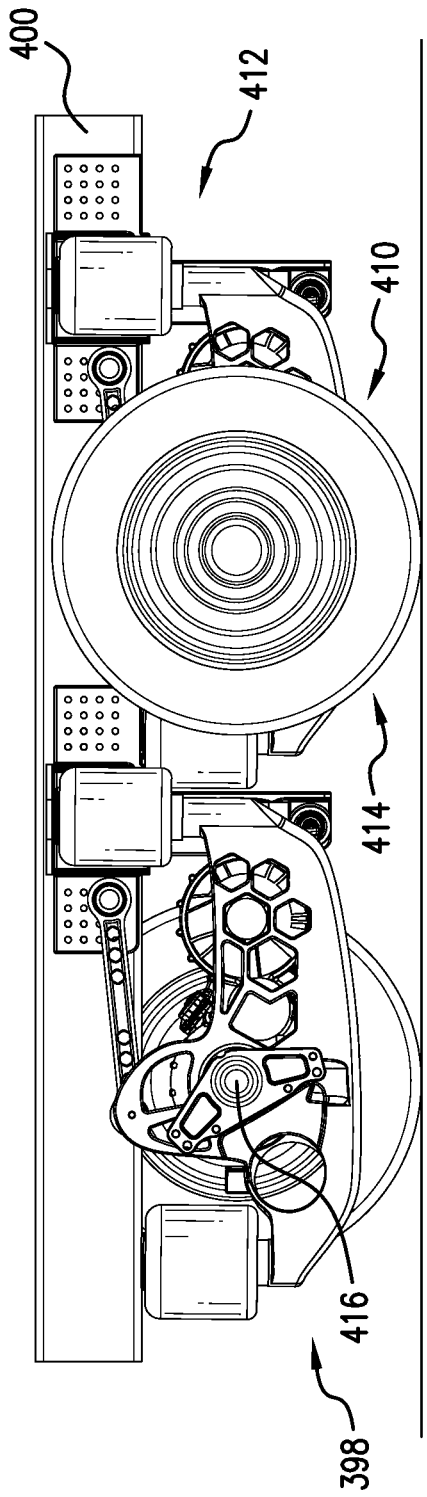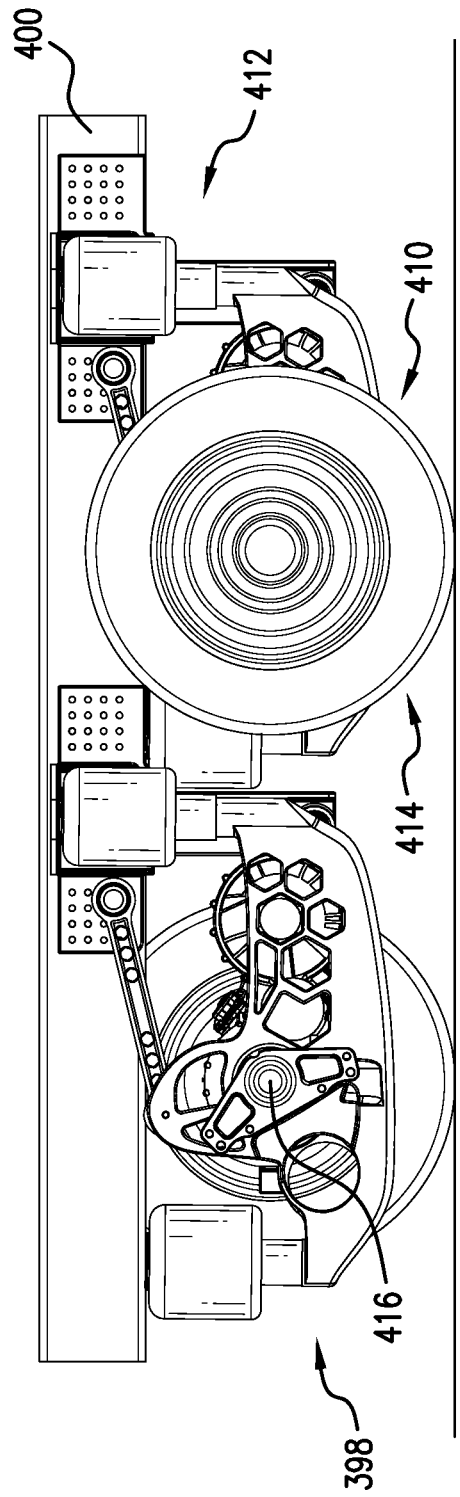
FIG.20A
FIG.20B

ELECTRICAL VEHICLE AXLE

CROSS-REFERENCE TO RELATED APPLICATIONS

This application claims the benefit of PCT/IB2019/000764 filed Jun. 28, 2019 and PCT/IB2019/000997 filed Jun. 28, 2019, each of which claims the benefit of U.S. Provisional Application No. 62/754,353 filed Nov. 1, 2018 and U.S. Provisional Application No. 62/693,599 filed Jul. 3, 2018, each of which is incorporated herein by reference in its entirety.

INTRODUCTION

The subject disclosure relates to vehicle axles and, more particularly, to an electric axle for a vehicle.

Vehicles have traditionally employed internal combustion engines as a source of propulsion. Currently, there is a trend for vehicles to employ alternate sources for propulsion. Many passenger vehicles employ full electric, or hybrid electric propulsion systems. Transport vehicles such as tractor trailers, buses and the like carry heavy loads and thus electric systems may not be suitable for all applications. The larger the load, the more power must be delivered to drive wheels. As drive power requirements increase, so does the need for more powerful electric motors and batteries to drive the electric motors. Accordingly, it is desirable to provide a system that can provide desired torque to drive a heavily laden vehicle.

SUMMARY

Disclosed is a vehicle including a frame, a first support member including a first end, a second end and an intermediate portion supporting a first axle receiver, a first bellows mounted to the first end of the first support member and connected with the frame, a second bellows mounted to the second end of the first support member and connected with the frame, a second support member including a first end portion, a second end portion and an intermediate section supporting a second axle receiver, a third bellows mounted to the first end portion of the second support member and connected with the frame, a fourth bellows mounted to the second end portion of the second support member and connected with the frame, a first drive unit including a first transmission mounted to the first support member, and a first electric motor operatively connected to the first transmission, and a second drive unit including a second transmission mounted to the second support member, and a second electric motor operatively connected to the second transmission.

In addition to one or more of the features described herein the first transmission includes wherein the first bellows is spaced from the third bellows a first distance and the second bellows is spaced from the fourth bellows a second distance that is distinct from the first distance.

In addition to one or more of the features described herein the first support member is formed from one of steel and iron.

In addition to one or more of the features described herein a brace member connecting the first and second support members with the frame.

In addition to one or more of the features described herein the first transmission includes a first housing formed from a material that is distinct from steel.

In addition to one or more of the features described herein the first housing is formed from aluminum.

In addition to one or more of the features described herein the first support member includes a spring mount.

In addition to one or more of the features described herein the first transmission includes a first transmission shaft operatively connected to the first electric motor, the first transmission shaft including a first bearing and a second bearing, the first bearing including a first back and a first face and second bearing including a second back and a second face, the first face being arranged opposite the second face.

In addition to one or more of the features described herein the first transmission includes a first transmission housing and a first transmission shaft, wherein the first electric motor includes a first stator operatively coupled to the first transmission housing and a first rotor operatively connected to the first transmission shaft.

In addition to one or more of the features described herein the first rotor includes a first rotor member connected to the first transmission shaft and a second rotor member coupled to the first transmission shaft spaced from the first rotor member, the first stator being arranged between the first and second rotor members.

In addition to one or more of the features described herein the first transmission includes a first transmission housing having a first transmission housing member and a second transmission housing member, and a first transmission shaft, a bolt extends through the first transmission shaft and mechanically connects the first transmission housing member with the second transmission housing member.

Also disclosed is a vehicle including a frame, a first support member including a first end, a second end and an intermediate portion supporting a first axle receiver, a second support member including a first end portion, a second end portion and an intermediate section supporting a second axle receiver, a first drive unit including a first transmission mounted to the first support member, and a first electric motor operatively connected to the first transmission, a first axle connected to the first transmission, a drive system including a planetary gear set connected to the first axle, and a hub connected to the first axle through the drive system. The first axle is shiftable to establish a first drive configuration and a second drive configuration of the drive system.

In addition to one or more of the features described herein the planetary gear set includes a plurality of planet gears mounted to an inner surface of the hub.

In addition to one or more of the features described herein the planetary gear set includes a sun gear rotatably mounted to the first axle.

In addition to one or more of the features described herein the planetary gear set includes a ring gear operatively connected with the plurality of planet gears.

In addition to one or more of the features described herein the ring gear is selectively connected to the first axle receiver through a geared interface.

In addition to one or more of the features described herein the hub is selectively connected to the sun gear through a geared interface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 depicts a diagram illustrating a stator/rotor arrangement of an electric motor of the electric axle, in accordance with an aspect of an exemplary embodiment;

FIG. 6 depicts a plan view of air springs arranged between portions of first and second electric axles and the vehicle frame, in accordance with an aspect of an exemplary embodiment;

FIG. 7 depicts a disassembled view of a transmission of the electric axle, in accordance with an aspect of an exemplary embodiment;

FIG. 8 depicts a portion of an electric axle, in accordance with an aspect of an exemplary embodiment;

FIG. 20A depicts the electric axle system of FIG. 17 in a first or low level configuration, in accordance with an aspect of an exemplary embodiment;

FIG. 20B the electric axle system of FIG. 17 in a second or driving level configuration, in accordance with an aspect of an exemplary embodiment;

DETAILED DESCRIPTION

Figure 1:
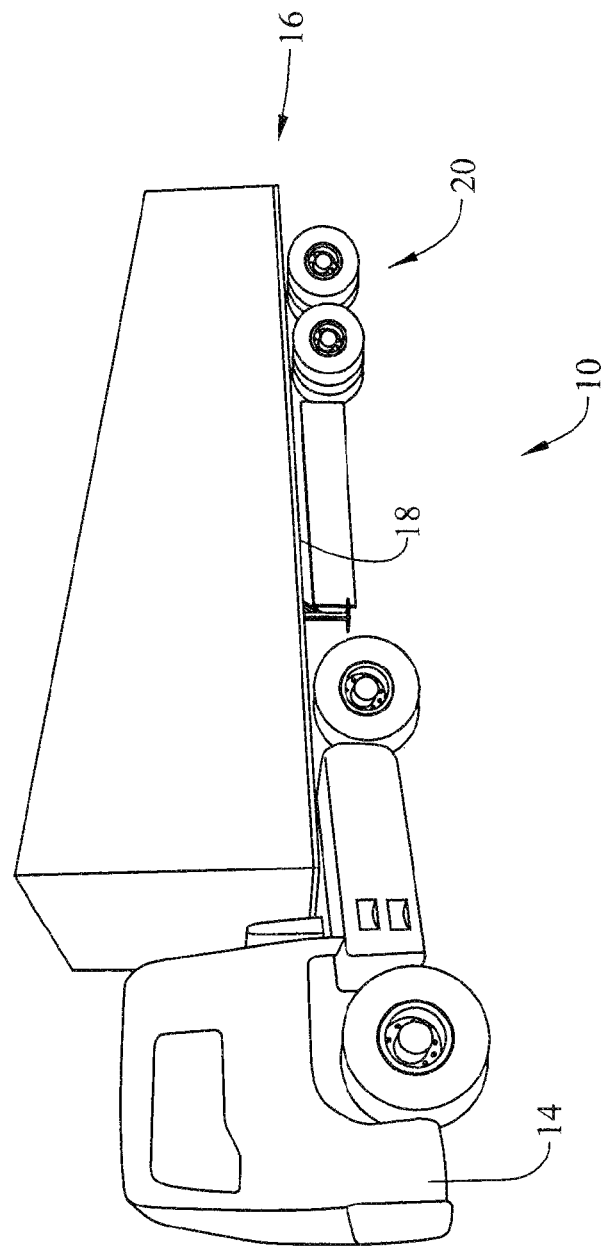
FIG. 1 depicts a vehicle, in the form of a tractor trailer, including an electric axle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

Figure 2:
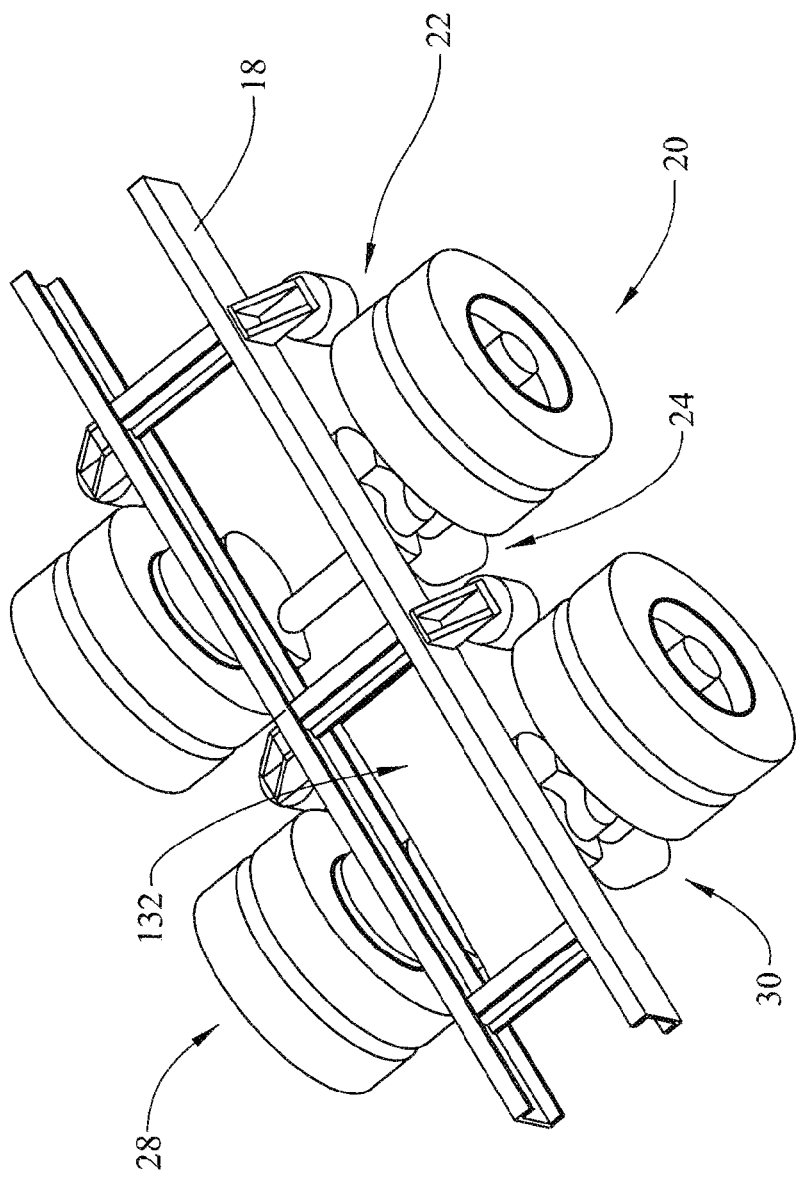
FIG. 2 depicts a pair of electric axles mounted to a frame of the vehicle of FIG. 1.

A vehicle, in accordance with an exemplary embodiment, is indicated generally at 10 in FIG. 1. Vehicle 10 may take the form of a transport vehicle including a tractor portion 14 and a trailer portion 16. Trailer portion 16 may include a frame 18 that supports a plurality of wheels 20. As shown in FIG. 2, frame 18 may support a first pair of wheels 22 supported by a first electric axle (e-axle) 24 and a second pair of wheels 28 supported by a second electric axle (e-axle) 30. As will be detailed herein, first and second e-axles may be selectively operated to provide an electrically powered motive force to first and second pairs of wheels 22 and 28.

Figure 3:
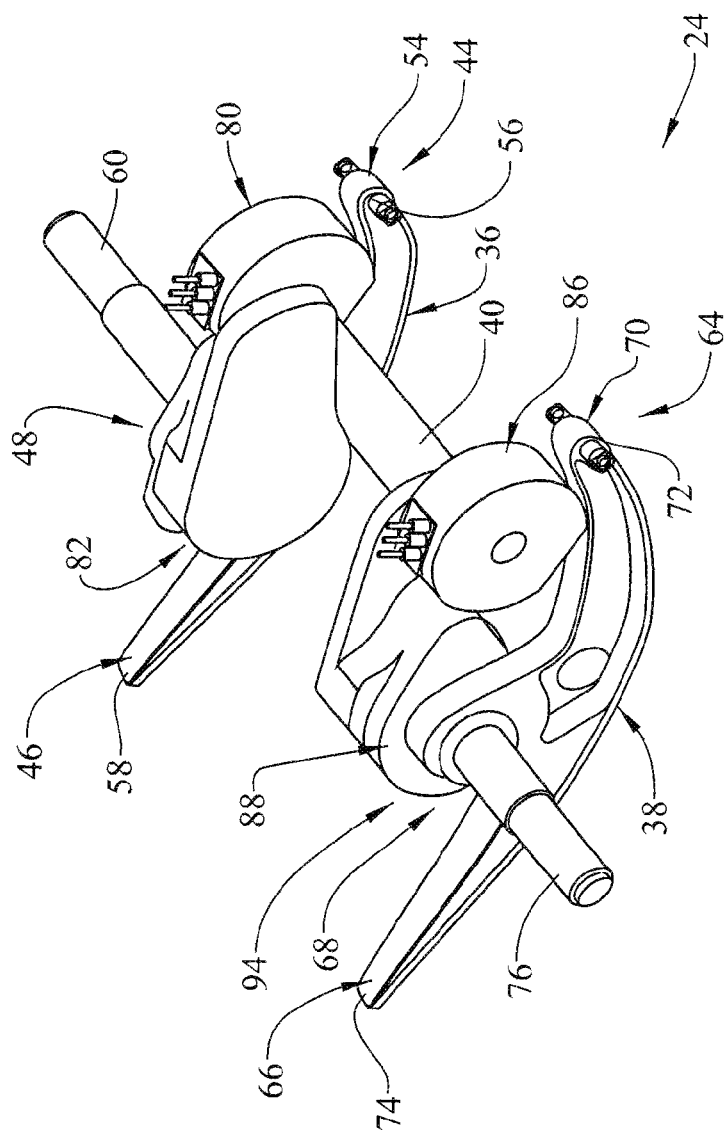
FIG. 3 depicts a perspective view of an electric axle, in accordance with an aspect of an exemplary embodiment.

Reference will now follow to FIG. 3 in describing first e-axle 24 with an understanding that second e-axle 30 may include similar structure. E-axle 24 includes a first support member 36 and a second support member 38 operatively connected through a torsion member 40. First and second support members 36 and 38 may be formed from steel, iron, cast iron or the like. In accordance with one exemplary aspect, torsion member 40 may be selectively configured to accommodate various loads and may include a diameter of between about 60 mm and about 80 mm. First support member 36 includes a first end 44, a second end 46, and an intermediate portion 48 extending therebetween. First end 44 defines a hinge end 54 having a hinge section 56 which connects to frame 18 as will be detailed herein. Second end 46 defines a first spring mount 58. Intermediate portion 48 supports a first axle receiver 60 having a hollow interior (not separately labeled) for receiving a first axle (also not separately labeled).

Second support member 38 includes a first end portion 64, a second end portion 66, and an intermediate section 68 extending therebetween. First end portion 64 defines a hinge end 70 having a hinge section 72, and second end portion 66 defines a second spring mount 74. Intermediate section 68 supports a second axle receiver 76 including a hollow interior (not separately labeled) that receives a second axle (also not separately labeled).

In an embodiment, first support member 36 supports a first drive unit (not separately labeled) including a first electric motor 80 operatively connected to a first transmission 82 and second support member 38 supports a second drive unit (also not separately labeled) including a second electric motor 86 operatively connected to a second transmission 88. At this point, it should be understood that first and second spring mounts 58 and 74 may be formed from a material that differs from that used to form first and second support members. In an example, first and second spring mounts 58 and 74 may be formed from aluminum. In an embodiment, first and second electric motors are mounted outwardly of frame 18 (FIG. 2) for vehicle 10. First transmission 82 is mechanically connected to the first axle and second transmission 88 is mechanically connected to the second axle as will be detailed herein.

Figure 4:
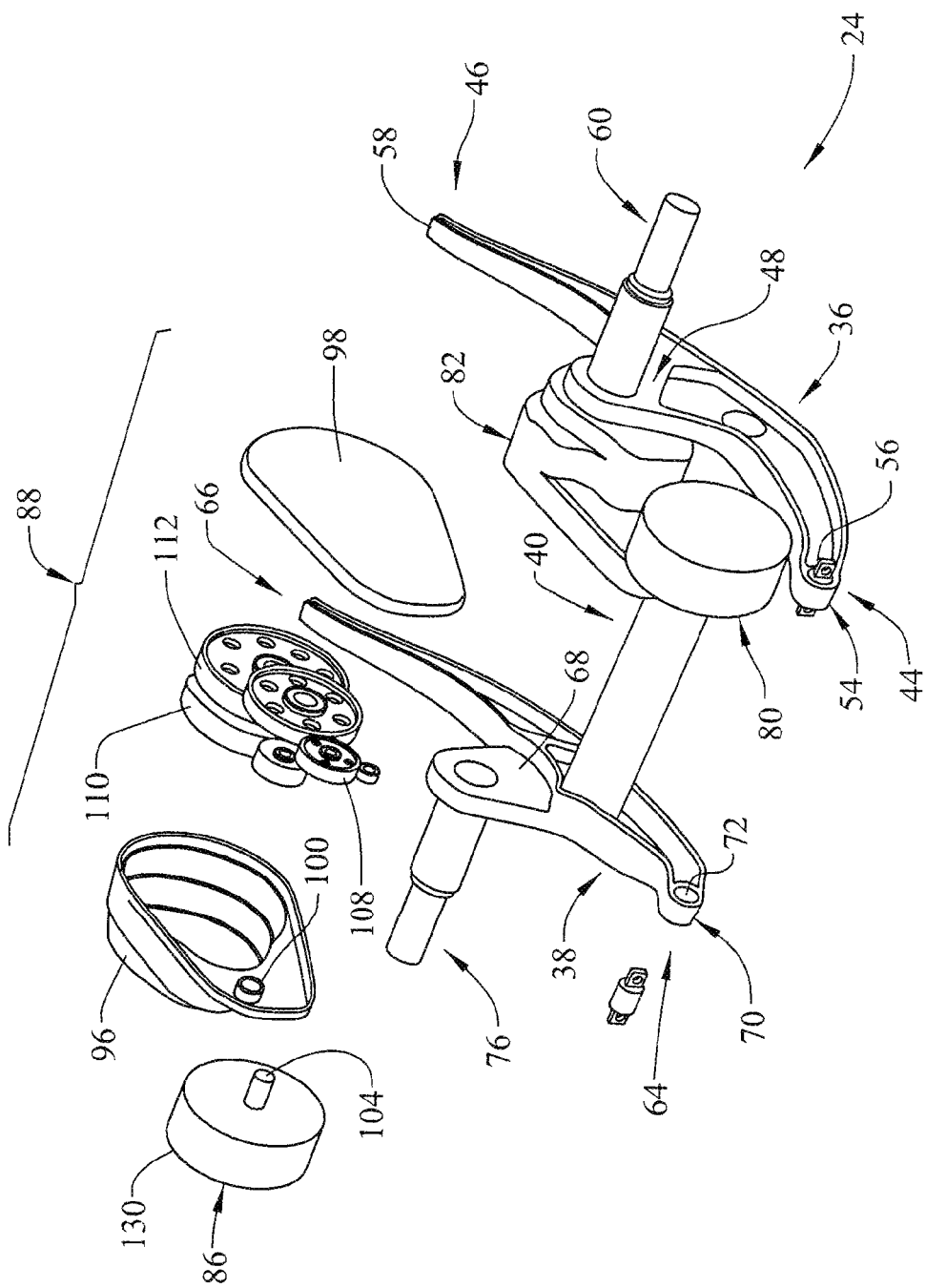
FIG. 4 depicts a partially disassembled view of the electric axle of FIG. 3, in accordance with an aspect of an exemplary embodiment.

Reference will now follow to FIG. 4 in describing the second drive unit including second electric motor 86 and second transmission 88 with an understanding that the first drive unit including first electric motor 80 and first transmission 82 may include similar structure. Second transmission 88 includes a transmission housing 94 (FIG. 3) having a first transmission housing member 96 and a second transmission housing member 98. First transmission housing member 96 includes an opening 100 that is receptive of a drive shaft 104 that is operatively connected to second electric motor 86.

Transmission housing 94 surrounds a drive gear 108 supported by drive shaft 104, a first driven gear 110 and a second driven gear 112. One or more intermediate gears (not separately labeled) may also be present. In an embodiment, first driven gear 110 has a diameter that is greater than second driven gear 112. First driven gear 110 may also be arranged outside of second driven gear 112, e.g., closer to second axle receiver 76. In an embodiment, a gear ratio between drive gear 108 and first driven gear 110 may be 27:1 and a ratio between drive gear 108 and second driven gear 112 may be 13.5:1. Second transmission 88 is supported at intermediate section 68 so as to reduce any spacing relative to second axle receiver 76.

Reference will now follow to FIG. 5 in describing second electric motor 86 with an understanding that first electric motor 80 may include similar structure. Second electric motor 86 includes a stator 120 having a first inner surface 121 and a rotor 122 having a second inner surface 123. Rotor 122 is rotatably supported relative to stator 120 through a rotor shaft 124 with second inner surface 123 directly facing first inner surface 121. In this manner, second electric motor 86 takes the form of an axial flux motor 128 with electrical flux passing between stator 120 and rotor 122 along an axis of rotation defined by rotor shaft 124. This allows second electric motor 86 to possess a more compact profile.

In an embodiment, second electric motor 86 includes a motor housing 130 (FIG. 4) that may be connected to transmission housing 94 (FIG. 3). Motor housing 130 includes a plurality of mounting holes (not separately labeled) that allow second electric motor 86 to be mounted to transmission housing 94 in a variety of configurations. Second electric motor 86 may also be readily removed from e-axle 24 without affecting operation of the first pair of wheels 22. That is, if desired, second electric motor 86 may be removed thereby allowing first pair of wheels 22 to rotate freely without any driving force. Second electric motor 86 may be connected to a battery 132, such as shown in FIG. 2. Battery 132 may be arranged between first and second support members 36 and 38. Battery 132 may be connected to one, another or both electric motors associated with a particular e-axle.

In an embodiment, first and second support members 36 and 38 (FIG. 3) are coupled to frame 18 through first and second air springs 134 and 135 such as shown in FIG. 6. A discussion will follow with respect to second air spring 135 with an understanding that first air spring 134 may include similar structure. Second air spring 135 includes a generally oval cross-section 138 including a major diameter 140 and a minor diameter 142. In an embodiment, major diameter 140 is about 330 mm and minor diameter 142 is about 270 mm. Of course, it should be understood, that these dimensions may vary. The orientation of first and second air springs 134 and 135, e.g., that the major diameter is substantially parallel to frame 18, provides greater space to accommodate battery 132 as seen in FIG. 2.

Reference will now follow to FIG. 7 in describing additional details of second transmission 88. As shown, a shift mechanism 146 is arranged between first driven gear 110 and second driven gear 112. Shift mechanism 146 may include a sensor assembly 150 having a suspension travel sensor, for example, an inclination sensor 152. Of course other types of suspension travel sensors may be employed. Sensor assembly 150 may also include an anti-lock brake (ABS) sensor 154.

Figure 9:
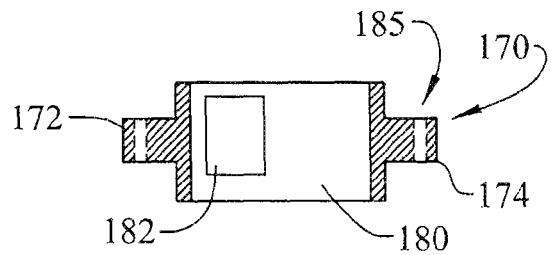
FIG. 9 depicts an attachment member for attaching a hinge end of the electric axle to a frame, in accordance with an aspect of an exemplary embodiment.

In FIG. 8, second hinge section 72 is shown with an attachment member 170. As shown in FIG. 9, attachment member 70 may include a first mounting ear 172 and a second mounting ear 174 supported by a body 180. First and second mounting ears 172 and 174 may serve as an interface between second support member 38 and vehicle frame 18. Body 180 may include an integrated suspension travel sensor 182 that is operable to provide feedback to vehicle mounted valves that may inflate or deflate air spring 134 to maintain the desired ride height. Attachment member 170 may also define a coolant connector 185 that may support a coolant conduit (not shown) at hinge end 70. Supporting coolant conduits at hinge end 70 reduces bending stresses that may occur as a result of suspension travel.

Figure 10:
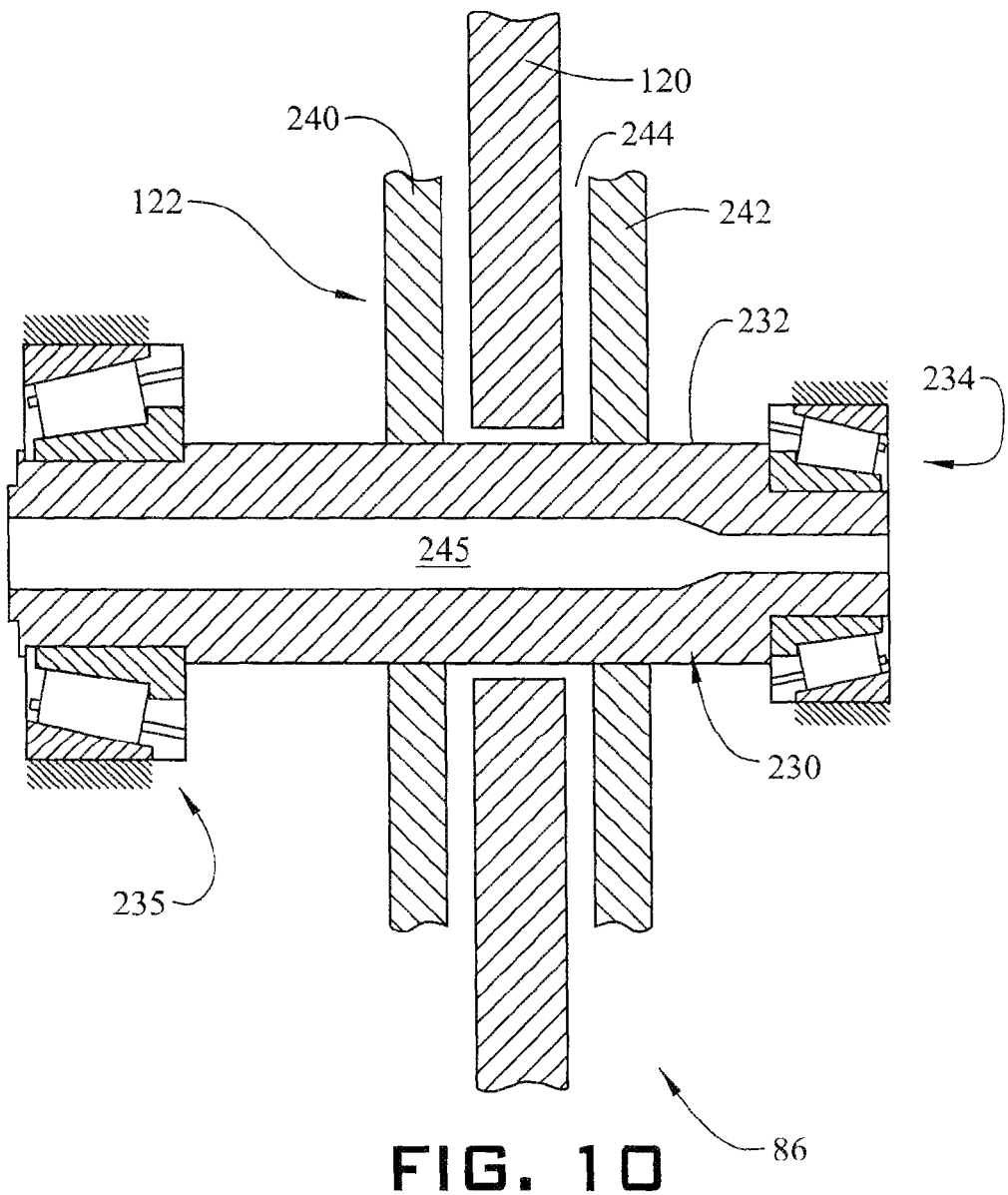
FIG. 10 depicts a partial cross-sectional view of a transmission shaft of the electric axle, in accordance with another aspect of an exemplary embodiment.

FIG. 10 depicts a transmission shaft 230 in accordance with another exemplary aspect. Transmission shaft 230 includes an outer surface 232 supported by a first bearing 234 and a second bearing 235. Rotor 122 may include a first rotor member 240 and a second rotor member 242 connected to outer surface 232. First rotor member 240 is spaced from second rotor member 242 forming a gap 244 (not separately labeled). Stator 120 extends into the gap 244 to establish the axial flux motor 128. Transmission shaft 230 may include a central lubrication passage 245 that delivers lubricant to first and second bearings 234 and 235. By coupling first and second rotor members 240 and 242 to outer surface 232 the need for separate rotor bearings is removed and first and second bearings 234 and 235 may be lubricated with transmission oil.

Figures 11, 12:
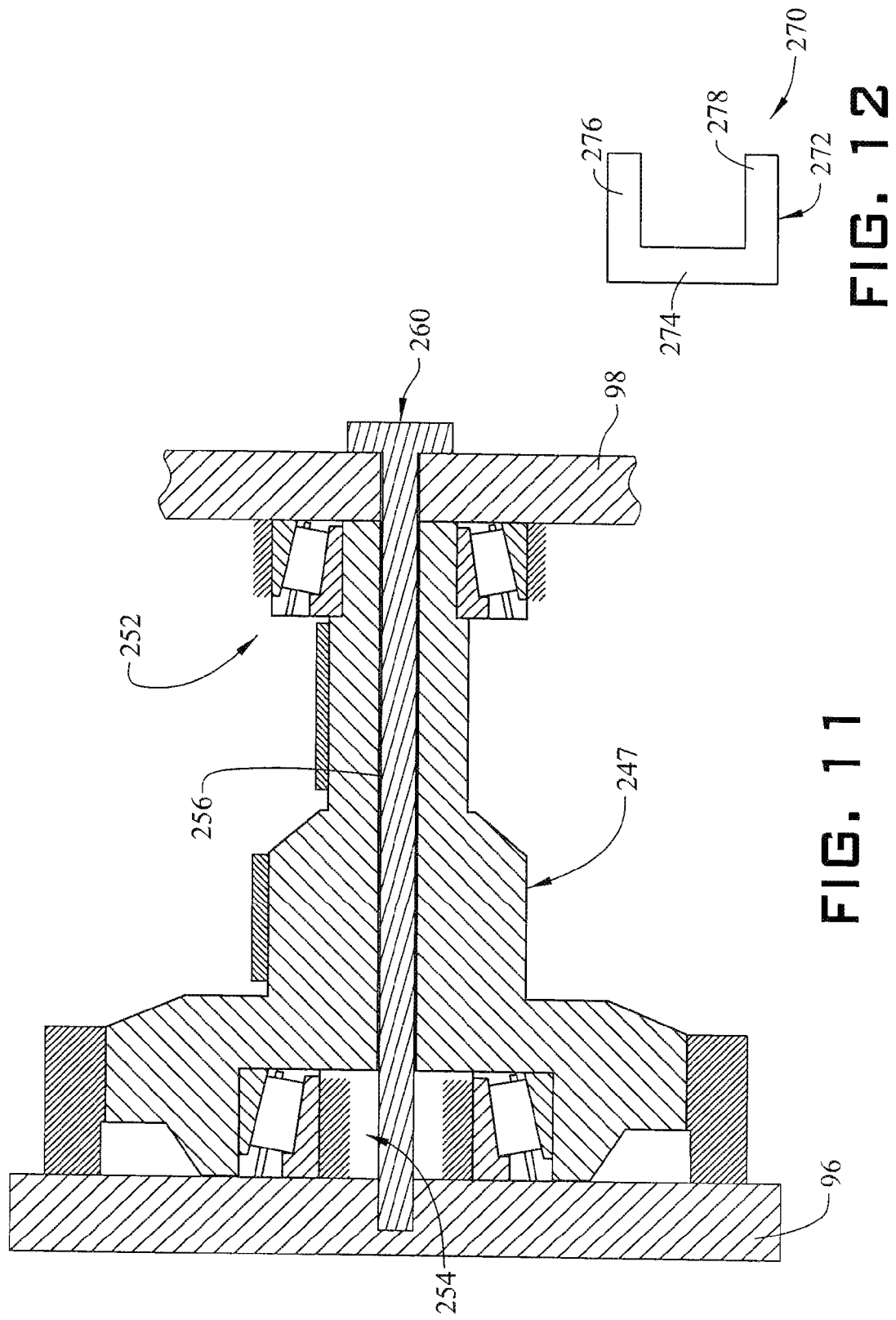
FIG. 11 depicts a partial cross-sectional view of a transmission shaft of the electric axle, in accordance with yet another aspect of an exemplary embodiment.
FIG. 12 depicts a cross-sectional view of a torsion member of the electric axle, in accordance with an aspect of an exemplary embodiment.
Figure 13:
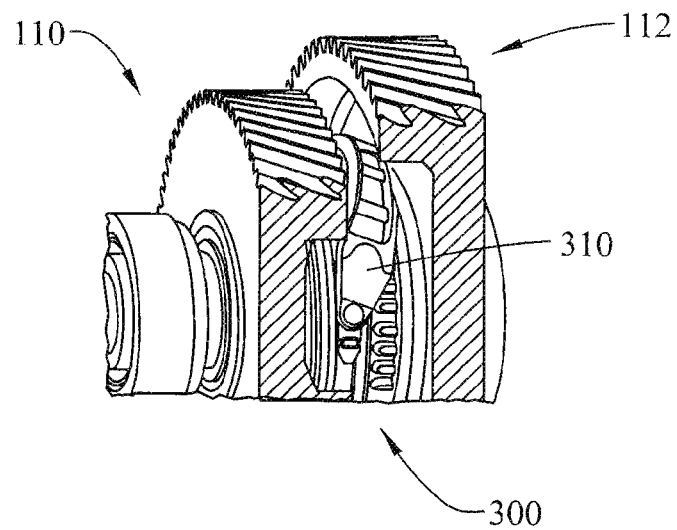
FIG. 13 depicts a partial view of a gear and shifter arrangement of the electric axle, in accordance with an exemplary embodiment.
Figure 14:
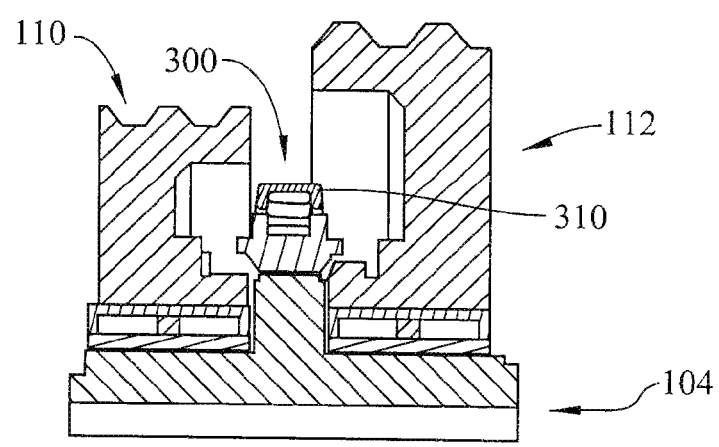
FIG. 14 depicts a partial cross-sectional view of the gear and shifter arrangement in a neutral configuration, in accordance with an exemplary aspect.
Figure 15:
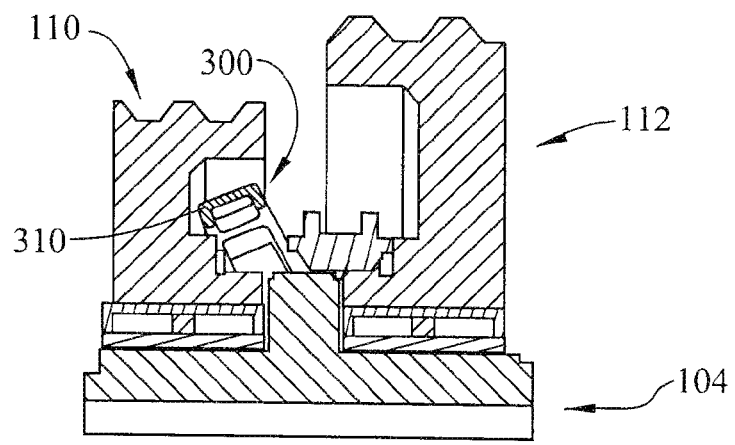
FIG. 15 depicts a partial cross-sectional view of the gear and shifter arrangement in a first drive configuration, in accordance with an exemplary aspect.
Figure 16:
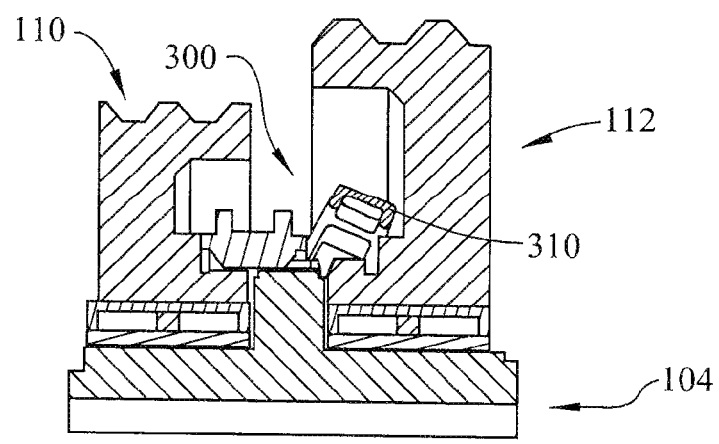
FIG. 16 depicts a partial cross-sectional view of the gear and shifter arrangement in a second drive configuration, in accordance with an exemplary aspect.

FIG. 11 depicts a transmission shaft 247 extending between first transmissions housing member 96 and second transmission housing member 98. Transmission shaft 247 is rotatably supported by a first bearing 252 and a second bearing 254. A central passage 256 extends through transmission shaft 247. Central passage 256 may accommodate a lubricant flow as well as be receptive of a mechanical fastener 260. Mechanical fastener 260 constrains movement of first transmission housing member 96 relative to second transmission housing member 98 so as to maintain desired gear alignment and increase system stiffness. While shown as extending through transmission shaft 247, it should be understood that a mechanical fastener may be passed through any shaft extending between first and second housing members 96 and 98.

FIG. 12 depicts a torsion member 270 that may connect first and second support member 36 and 38 (FIG. 3). In accordance with an exemplary aspect. Torsion member 270 includes a C-shaped cross-section 272 defined by a base or first section 274, a first leg section 276 and a second leg section 278. First and second leg sections 274 and 276 are spaced one, from another, forming an opening (not separately labeled). The opening may face rearward, away from first and second hinge ends 54 and 70. C-shaped cross-section 276 so positioned provides greater bending stiffness in two directions while keeping the torsional stiffness at a selected threshold.

FIGS. 13-16 depict a shifting mechanism 300 operatively associated with first driven gear 110 and second driven gear 112. Shifting mechanism 300 includes a swing fork 310 that may be selectively positioned in a first or neutral configuration (FIG. 14), a first drive configuration (FIG. 15), and a second drive configuration (FIG. 16) depending upon speed and torque requirements of the associated one of first and second e-axles 24 and 30. In an embodiment, swing fork 310 includes a swing action that remains within a circumference of first and second driven gears 110 and 112 so as to enable the use of a wide gear profile thereby increasing an overall torque carrying capacity. Swing fork 310 also enables first and second driven gears 110 and 112 to be arranged with minimal spacing.

Figure 17:
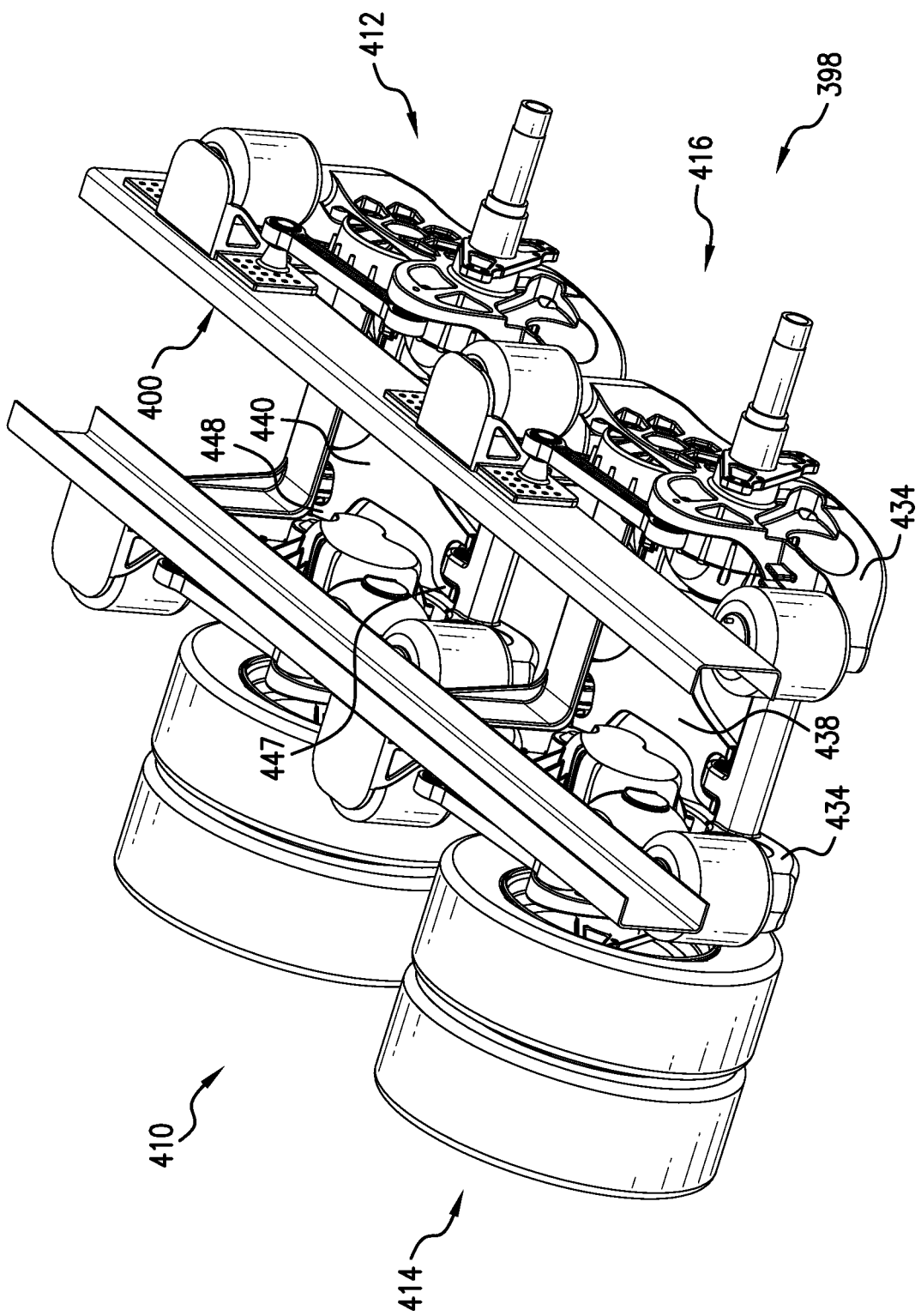
FIG. 17 depicts an electric axle system, in accordance with another aspect of an exemplary embodiment.
Figure 19:
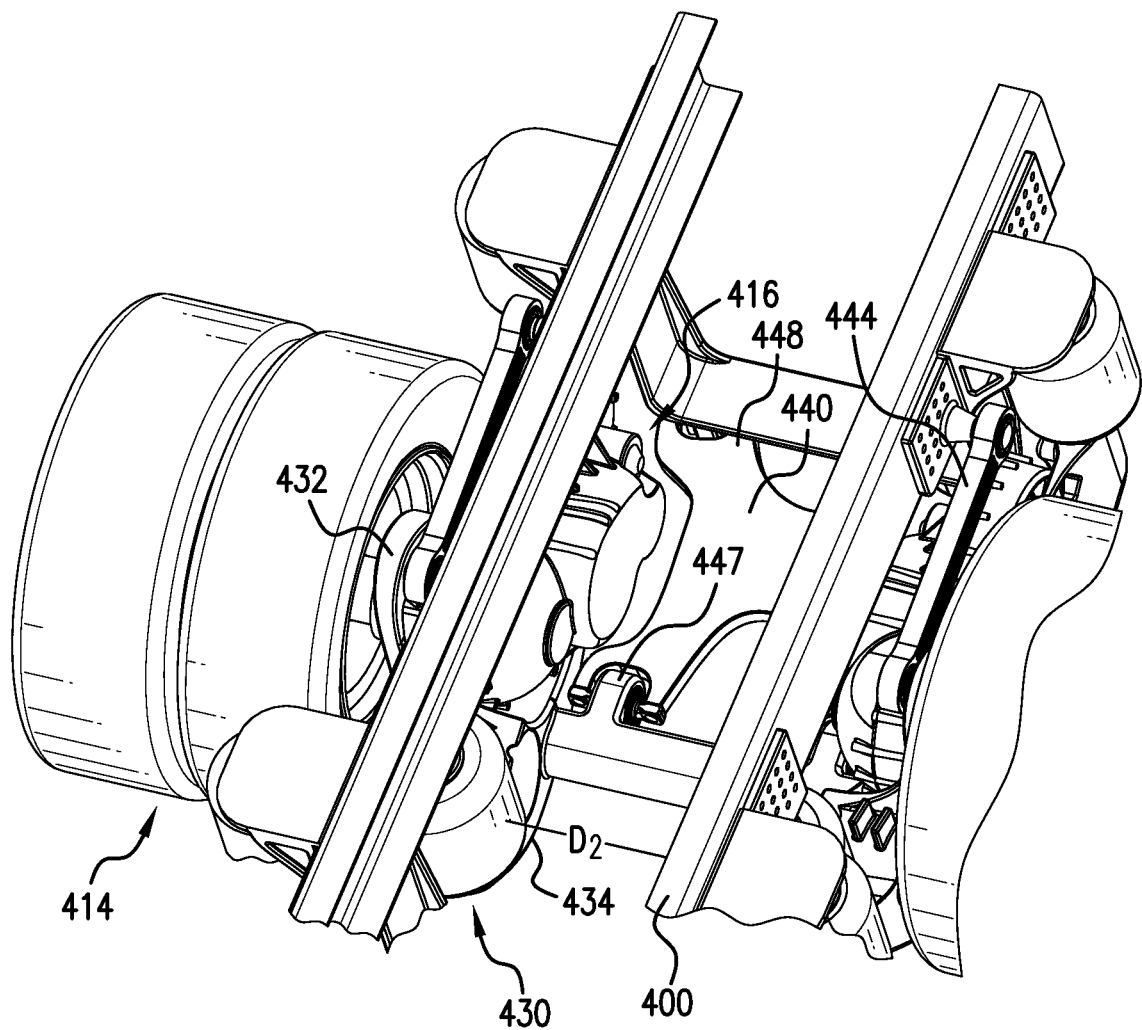
FIG. 19 depicts a brace member of the electric axle system of FIG. 17.

Reference will now follow to FIGS. 17 and 19, in describing an electric axle (e-axle) system 398 in accordance with another aspect of an exemplary embodiment. E-axle system 398 is mounted to a frame 400 having a plurality of wheels 406 that support, for example, a trailer. Plurality of wheels 406 includes a first pair of wheels 410 connected to frame 400 through a first e-axle system 412 and a second pair of wheels 414 connected to frame 400 through a second e-axle system 416. It should be understood that frame 400 may take on various forms including, for example, a truss.

A first pair of bellows or springs 420 connect a forward end (not separately labeled) of first e-axle system 412 to frame 400. A second pair of bellows 422 connect a rear end (also not separately labeled) of first e-axle system 412 to frame 400. Similarly, a first pair of bellows or springs 428 connect a forward end (not separately labeled) of second e-axle system 416 to frame 400. A second pair of bellows 430 connect a rear end (also not separately labeled) of second e-axle system 416 to frame 400. The use of two pairs of bellows on each e-axle system 412 and 416 provides certain suspension advantages for the vehicle.

Figure 18:
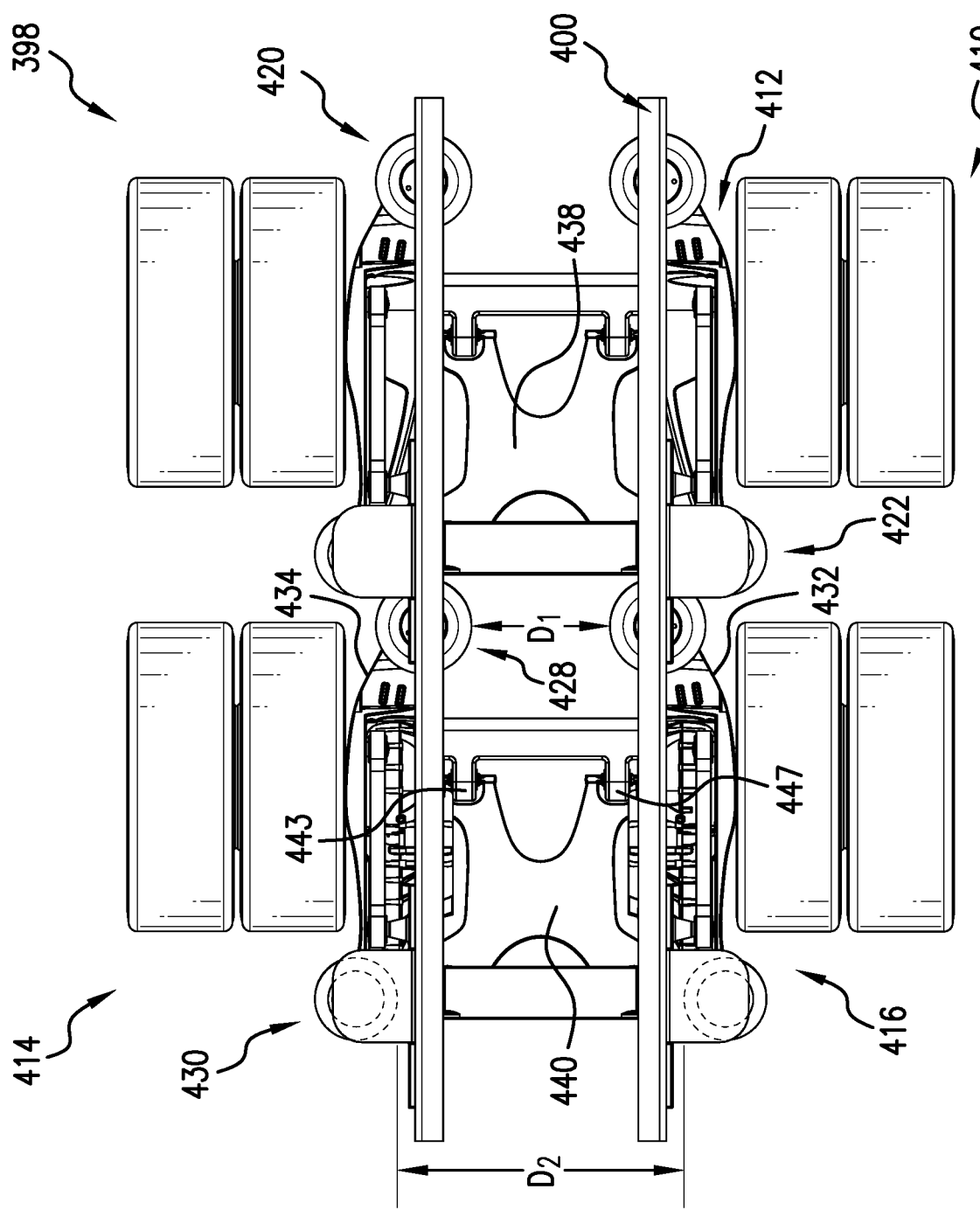
FIG. 18 depicts a top view of the electric axle system of FIG. 17.

Reference will now follow to FIGS. 18 and 19 in describing second e-axle system 416 with an understanding that first e-axle system 412 includes similar structure. Second e-axle system 416 includes a first support member 432 arranged on a first side (not separately labeled) of frame 400 and a second support member 434 arranged on a second side (also not separately labeled) of frame 400. First support member 433 includes a first end, and an opposing second end (not separately labeled). Second support member 434 includes a first end portion and an opposing second end portion (also not separately labeled).

First pair of bellows 428 connect first end and first end portion of first and second support members 433 and 434 to frame 400. Second pair of bellows 430 connect second end and second end portion of first and second support members 433 and 434 to frame 400. In the embodiment shown, first pair of bellows 428 are spaced one, from the other a first distance D1. Second pair of bellows 430 are spaced one from the other a second distance D2 that is distinct from the first distance. In an exemplary aspect, the second distance D2 is greater than the first distance D1. The different spacing allows first e-axle system 412 to be positioned closer to second e-axle system 416.

First e-axle system 412 includes a first brace member 438 and second e-axle system 416 includes a second brace member 440. First brace member 438 may be arranged centrally of first e-axle system 412 and second brace member 440 may be arranged centrally of second e-axle system 416. Reference will now follow to FIG. 19, and with continued reference to FIGS. 17 and 18, in describing second brace member 440 with an understanding that first brace member 438 may include similar structure. Second brace member 440 includes a first connector 443 and a second connector (not shown) that are coupled to frame 400 through corresponding first and second bushings (not separately labeled). The bushings may include elastomeric portions. Second brace member 440 also includes a third connector 447 and a fourth connector 448. Third and fourth connectors 447 and 448 are coupled to second e-axle system 416 through corresponding third and fourth bushings (not separately labeled). The bushings may include elastomeric portions. Second brace member 440 provides horizontal and roll stability to frame 400 while also ensuring that adequate space is available to support various e-axle system components such as batteries (not shown).

Figure 20C:
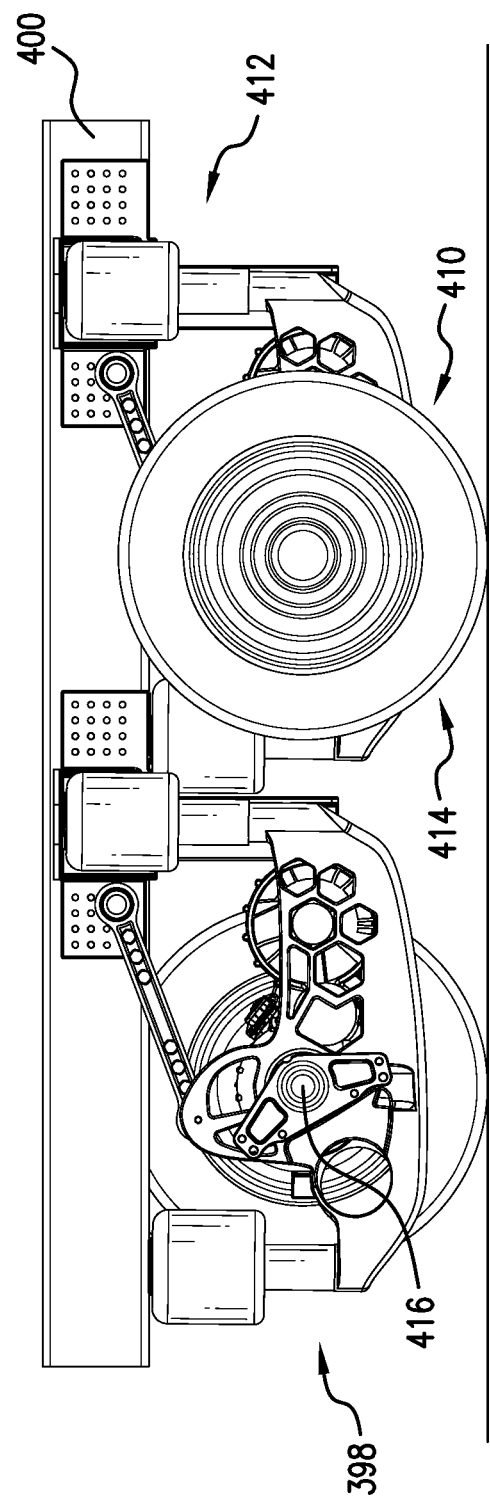
FIG. 20C depicts the electric axle system of FIG. 17 in a third or high level configuration, in accordance with an aspect of an exemplary embodiment.

First and second pairs of bellows 420, 428 and 422, 430 provide for a more even (front to back) transition between various loading positions for frame 400. That is, in contest to a cantilevered systems described herein, first and second pairs of bellows 420, 428 and 422, 430 promote a more uniform transition between a low position FIG. 20a, a drive position FIG. 20b, and a high position FIG. 20c which promotes more even wear for drive system components. Additionally, first and second pairs of bellows 420, 428 and 422, 430 enhance ride comfort by providing a fully floating suspension system.

Figure 21:
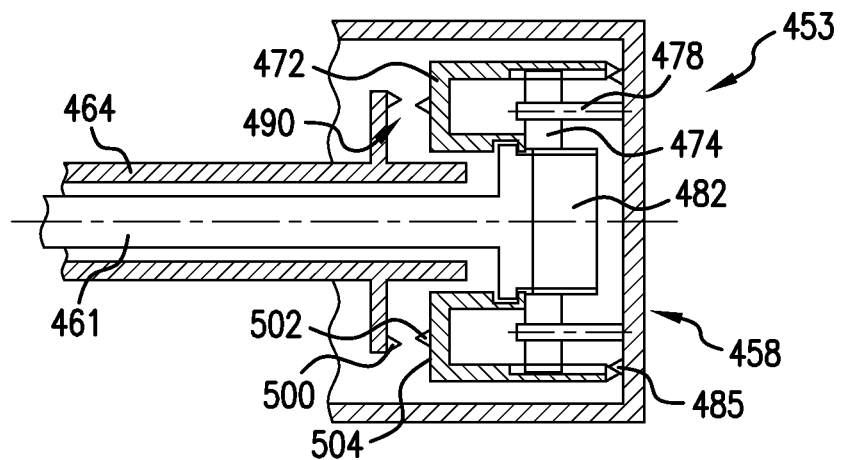
FIG. 21 depicts a planetary gear set arranged in the electric axle in a first configuration, in accordance with an aspect of an exemplary embodiment.
Figure 22:
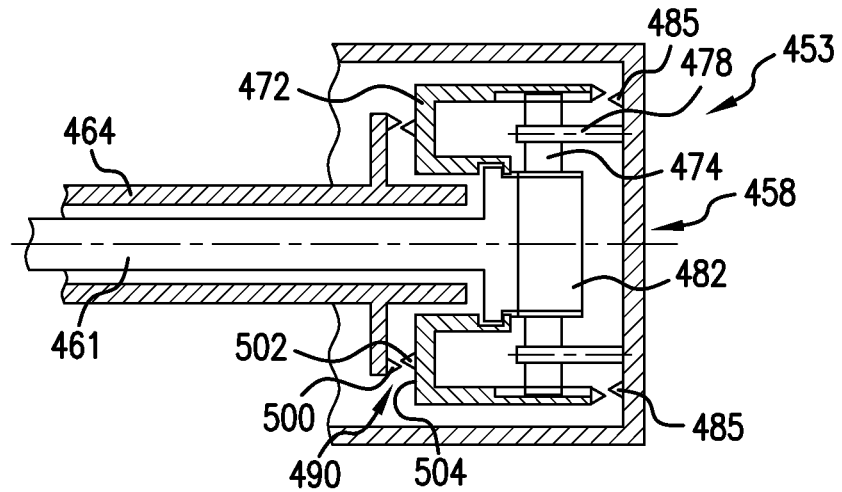
FIG. 22 depicts a planetary gear set arranged in the electric axle in a second configuration, in accordance with an aspect of an exemplary embodiment.
Figure 23:
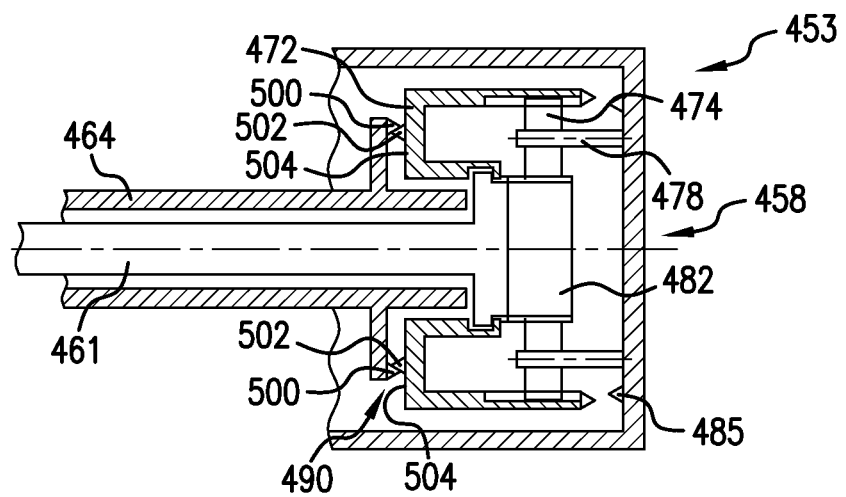
FIG. 23 depicts a planetary gear set arranged in the electric axle in a third configuration, in accordance with an aspect of an exemplary embodiment.

Reference will now follow to FIGS. 21-23 in describing a two speed drive system 453 for the vehicle, such as trailer portion 16, in accordance with an exemplary embodiment. Each pair of wheels, for example first pair of wheels 410 and second pair of wheels 414 includes a hub 458. At this point, it should be understood that the drive system may be incorporated into first pair of wheels 22 and second pair of wheels 28 described herein. Hub 458 may be connected to, for example, first e-axle system 412 through an axle 461. It should be understood that hub 458 may be coupled to any of the e-axles described herein. Axle 461 extends through an axle receiver 64 and supports drive system 453.

In an embodiment, drive system 453 include a ring gear 472 that is supported at an end (not separately labeled) of axle 461. More specifically, ring gear 472 includes an annular slot (not separately labeled) that receives a projection (also not separately labeled) extending radially outwardly of the end of axle 461. Ring gear 472 is operatively connected to a plurality of planet gears, one of which is indicated at 474 supported by a planet carrier 478. In an embodiment, planet carrier 478 is connected to an inner surface (not also not separately labeled) of hub 458. Planet gears 474 are operatively connected to a sun gear 482 that is supported on the end of axle 461. A gear element 485 is mounted to the inner surface of hub 458. Gear element 485 selectively engages with ring gear 472. While shown as being connected through a sliding groove interface (not separately labeled), it should be understood that sun gear 482 and ring gear 472 may interface through a ball bearing arrangement in order to further reduce friction. A geared interface 490 is arranged between axle receiver 464 and ring gear 472. Geared interface 490 includes a first gear 500 mounted to the end of axle receiver 464 and a second gear 502 mounted to an outer surface 504 of ring gear 472. When engaged, first gear 500 locks rotation of ring gear 472 relative to axle receiver 464. It should be understood that while shown as connecting through planet gears 474, hub 458 may connect directly to sun gear 482 through a geared interface.

In an embodiment, under normal highway driving conditions, ring gear 472 is engages with gear element 485 to establish a 1:1 gear ratio (FIG. 21). If, more torque is desired, such as for climbing a hill, starting on an incline or the like, axle 461 may be shifted radially inwardly (FIG. 22) to engage first gear 500 and second gear 502 of geared interface 490 to lock rotation of ring gear 472 (FIG. 23). In this configuration, hub 458 is rotated through an interaction of sun gear 482 and planet gears 474 to establish, for example, a 3:1 gear ratio that provides increased torque. It should be understood that the particular gear ratios may vary. Coupled with, for example, first transmission 82, two-speed drive system 453 may provide four gear options for operating trailer portion 16.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:
a frame;
a first support member including a first end, a second end and an intermediate portion supporting a first axle receiver;
a first bellows mounted to the first end of the first support member and connected with the frame;
a second bellows mounted to the second end of the first support member and connected with the frame;
a second support member including a first end portion, a second end portion and an intermediate section supporting a second axle receiver;
a third bellows mounted to the first end portion of the second support member and connected with the frame;
a fourth bellows mounted to the second end portion of the second support member and connected with the frame;
a first drive unit including a first transmission mounted to the first support member, and a first electric motor operatively connected to the first transmission, wherein the first transmission includes a first transmission housing and a first transmission shaft, wherein the first electric motor includes a first stator operatively coupled to the first transmission housing and a first rotor operatively connected to the first transmission shaft, the first rotor includes a first rotor member connected to the first transmission shaft and a second rotor member coupled to the first transmission shaft spaced from the first rotor member, the first stator being arranged between the first and second rotor members; and
a second drive unit including a second transmission mounted to the second support member, and a second electric motor operatively connected to the second transmission.

2. The vehicle according to claim 1, wherein the first bellows is spaced from the third bellows a first distance and the second bellows is spaced from the fourth bellows a second distance that is distinct from the first distance.

3. The vehicle according to claim 1, wherein the first support member is formed from one of steel and iron.

4. The vehicle according to claim 1, further comprising: a brace member connecting the first and second support members with the frame.

5. The vehicle according to claim 1, wherein the first transmission includes a first housing formed from a material that is distinct from steel.

6. The vehicle according to claim 5, wherein the first housing is formed from aluminum.

7. The vehicle according to claim 1, wherein the first support member includes a spring mount.

8. The vehicle according to claim 1, wherein the first transmission includes a first transmission shaft operatively connected to the first electric motor, the first transmission shaft including a first bearing and a second bearing, the first bearing including a first back and a first face and second bearing including a second back and a second face, the first face being arranged opposite the second face.

9. The vehicle according to claim 1, wherein the first transmission includes a first transmission housing having a first transmission housing member and a second transmission housing member, and a first transmission shaft, a bolt extends through the first transmission shaft and mechanically connects the first transmission housing member with the second transmission housing member.

10. A vehicle comprising:
a frame;
a first support member including a first end, a second end and an intermediate portion supporting a first axle receiver;
a second support member including a first end portion, a second end portion and an intermediate section supporting a second axle receiver;
a first drive unit including a first transmission mounted to the first support member, and a first electric motor operatively connected to the first transmission, wherein the first transmission includes a first transmission housing and a first transmission shaft, wherein the first electric motor includes a first stator operatively coupled to the first transmission housing and a first rotor operatively connected to the first transmission shaft, the first rotor includes a first rotor member connected to the first transmission shaft and a second rotor member coupled to the first transmission shaft spaced from the first rotor member, the first stator being arranged between the first and second rotor members;
a first axle connected to the first transmission;
a drive system including a planetary gear set connected to the first axle; and
a hub connected to the first axle through the drive system, wherein the first axle is shiftable to establish a first drive configuration and a second drive configuration of the drive system.

11. The vehicle according to claim 10, wherein the planetary gear set includes a plurality of planet gears mounted to an inner surface of the hub.

12. The vehicle according to claim 10, wherein the planetary gear set includes a sun gear rotatably mounted to the first axle.

13. The vehicle according to claim 10, wherein the planetary gear set includes a ring gear operatively connected with the plurality of planet gears.

14. The vehicle according to claim 10, wherein the ring gear is selectively connected to the first axle receiver through a geared interface.

15. The vehicle according to claim 10, wherein the hub is selectively connected to the sun gear through a geared interface.

* * * * *